United States Patent
Tachibana et al.

(10) Patent No.: US 10,348,231 B2
(45) Date of Patent: Jul. 9, 2019

(54) MOTOR CONTROL DEVICE AND MOTOR CONTROL METHOD

(71) Applicant: Mitsubishi Electric Corporation, Tokyo (JP)

(72) Inventors: Tomoya Tachibana, Tokyo (JP); Masahiro Iezawa, Tokyo (JP); Daiki Matsuura, Tokyo (JP); Noriyuki Wada, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/259,501

(22) Filed: Sep. 8, 2016

(65) Prior Publication Data
US 2017/0288588 A1 Oct. 5, 2017

(30) Foreign Application Priority Data
Mar. 29, 2016 (JP) ................. 2016-065384

(51) Int. Cl.
*H02P 6/14* (2016.01)
*H02P 21/22* (2016.01)
*H02P 27/08* (2006.01)

(52) U.S. Cl.
CPC ............. *H02P 21/22* (2016.02); *H02P 6/14* (2013.01); *H02P 27/08* (2013.01)

(58) Field of Classification Search
CPC . H02P 21/22; H02P 6/14; H02P 27/08; G01R 13/00; G01R 11/00; G01R 17/00
See application file for complete search history.

(56) References Cited

U.S. PATENT DOCUMENTS

| | | | |
|---|---|---|---|
| 2011/0031909 A1* | 2/2011 | Ohgushi | H02P 21/16 318/400.02 |
| 2011/0080125 A1* | 4/2011 | Shimada | H02P 5/74 318/400.09 |
| 2012/0206077 A1* | 8/2012 | Yoneshima | H02P 6/185 318/400.33 |
| 2012/0217849 A1* | 8/2012 | Aoki | H02P 6/18 310/68 D |
| 2015/0365026 A1* | 12/2015 | Schock | H02P 27/08 318/400.04 |

FOREIGN PATENT DOCUMENTS

JP        2011-83068 A        4/2011

* cited by examiner

*Primary Examiner* — Eduardo Colon Santana
*Assistant Examiner* — Said Bouziane
(74) *Attorney, Agent, or Firm* — Sughrue Mion, PLLC; Richard C. Turner (57) ABSTRACT

A motor control device includes a current detector which, in generating a feedback current value on the basis of the detection result of a three-phase AC current supplied from an inverter to a motor, generates a first current detection value based on a first sample timing and a second current detection value based on a second sample timing that is shorter than the first sample timing; a coordinates converter which converts the coordinates of the first current detection value and the second current detection value to q and d axes; and a detection current processor which generates a feedback current value from the coordinate conversion results.

16 Claims, 9 Drawing Sheets

FIRST SAMPLE TIMING (FREQUENCY RATIO: 18)

FIG. 3B

FIRST SAMPLE TIMING (FREQUENCY RATIO: 6)

FIG. 3C

SECOND SAMPLE TIMING (FREQUENCY RATIO: 6)

MOTOR CONTROL DEVICE AND MOTOR CONTROL METHOD

BACKGROUND OF THE INVENTION

1. Field of the Invention

The present invention relates to a motor control device and a motor control method wherein an AC motor such as a permanent magnet synchronous motor, induction motor or reluctance motor is controlled by an inverter.

2. Description of the Related Art

A prior art method for controlling an AC motor is known in which a voltage applied from an inverter to a motor is controlled by performing control operations to convert the detection result of a value of current flowing in the AC motor, to two axis components on a rotational coordinates system (see, for example, Japanese Patent Application Publication No. 2011-83068).

More specifically, this prior art performs control by the following procedure.

The current value detected by a current sensor provided on the three-phase AC side of the inverter is converted into two axis components on a rotational coordinates system which is synchronized with the position of the rotor of the motor, namely, a d-axis component current (magnetic flux component current) and a q-axis component current (torque component current).

The voltage applied from the inverter to the motor is controlled in such a manner that the d-axis component current and q-axis component current after conversion coincide with a d-axis current command and a q-axis current command computed from the torque command.

SUMMARY OF THE INVENTION

However, the prior art involves the following problems.

When performing control of this kind, a three-phase current is sampled using a microcomputer on the basis of a detection cycle, and a discrete-system computation process is carried out by the microcomputer. The microcomputer detects the current once in one cycle of the current control, and performs feedback control in accordance with the deviation in relation to a current command value. Here, the sampling cycle is to be no more than ½ of the cycle of the detection signal, in order that the current is detected accurately.

In the discrete-system computation process performed by the microcomputer, if the sampling cycle is longer than ½, then low-frequency fold-back noise, which is not present in the actual signal, may occur. Below, this phenomenon is called "aliasing". Meanwhile, if the control frequency is shortened in order to raise the accuracy of current detection, the processing load on the microcomputer increases. Therefore, the current control cycle is set in accordance with the operational state of the motor, to a value which avoids the processing capacity of the microcomputer from exceeding an upper limit.

The three-phase current flowing in the motor includes a fundamental wave frequency component, and high-frequency components of the fundamental wave frequency, such as the fifth-order component, seventh-order component, eleventh-order component, thirteenth-order component, and so on. For example, when the rotational speed of the motor is high, then the cycle of the current ripple flowing in the three-phase current approaches the processing cycle for detecting the current.

In a state such as this, there is a problem in that the torque accuracy deteriorates (in other words, the deviation of the actual torque with respect to the torque command aggravates) due to aliasing of the current detection.

In order to solve the problem of deterioration in the torque accuracy due to error in the current detection, it is necessary to extract the fundamental wave component of the current with high accuracy. One method for this is a current over-sampling method which carries out current detection several times in one cycle of current control, or a random sampling method which detects the current in such a manner that the timing of detection in one cycle of current control differs from the previous cycle.

As stated above, in current control, a method is used in which the detection current value or voltage command value is computed by coordinate conversion. In a coordinates converter, two-axis component currents (Id, Iq) including the detected three-phase current values (Iu, Iv, Iw) and a reference phase are generated. Similarly, a three-phase voltage command (Vu, Vv, Vw) is generated from the voltage command value (Vd, Vq) and the reference phase. In many cases, the two-axis component currents and the three-phase voltage command are processed in a computation cycle based on the current control cycle.

On the other hand, if calculation is made by coordinate conversion using a current over-sampling method or a random sampling method, then the timing for performing current detection does not correspond to the current control cycle. Consequently, the angle used for coordinate conversion differs between the generation of the two-axis component currents (Iu, Iv, Iw→Id, Iq) and the generation of the three-phase voltage commands (Vd, Vq→Vu, Vv, Vw).

Here, a case is envisaged in which a resolver, or the like, is used for detecting the rotor position of the motor, the detected angle deviates from the actual angle of rotation, and the error changes cyclically.

In coordinate conversion based on the current control cycle hitherto, the element of current control that is proportional to the angular error operates so as to cancel out the angular error. Consequently, the variation in the integral element caused by angular error which varies cyclically is compensated and the effect thereof on controllability can be suppressed.

On the other hand, since the timing at which the current is detected varies from the current control cycle in a current over-sampling method or a random sampling method, then it is difficult to compensate for variation caused by angular error in the proportional element of the current control. Due to this effect, the control stability of the motor is reduced, and consequently there is a problem in that the current consumption increases, and so on. Problems of this kind are not limited to angular error, and occur similarly in relation to variations such as power voltage ripples, and the like.

Furthermore, when the angular error is superimposed, the phase current detected by the current sensor is offset to the positive side or negative side. The d-axis component current and q-axis component current which are synchronized with the rotor position information of the motor give rise to current pulsations which include low-order harmonic component current caused by the offset current.

In a conventional over-sampling method, a process for removing the high-frequency components by passing through a low-pass filter having a low cut-off frequency is carried out as a countermeasure to aliasing. However, when a low-pass filter having a low cut-off frequency is used, the positional deviation of the low-order harmonic components becomes large, and there is a problem of deterioration of controllability.

The present invention was devised in order to resolve a problem of this kind, an object thereof being to obtain a motor control device and motor control method capable of ensuring torque accuracy by suppressing the occurrence of low-frequency fold-back noise caused by aliasing, while also restricting increase in the computational processing load, as well as being able to ensure control stability with respect to environmental variations, such as angular error, power voltage ripples, and the like.

The motor control device according to the present invention includes: an inverter which converts between direct current and alternating current; a motor which is connected to the output side of the inverter and is driven by receiving the application of an AC voltage; a current sensor which detects AC current in the inverter; and a controller which performs current detection in respect of the output signal from the current sensor at two different sample timings, generates a feedback current value on the basis of a result of the current detection, and controls the inverter in such a manner that the feedback current value matches the current command value; wherein the controller includes: a current detector for which there are previously set a first sample timing and a second sample timing having a shorter detection cycle than the first sample timing, as the two different sample timings, and which sequentially outputs, as the result of the current detection, a first current detection value based on the first sample timing and a second current detection value based on the second sample timing; a coordinates converter which converts the coordinates of the first current detection value detected as three phases to a first d-axis current value and a first q-axis current value, and converts the coordinates of the second current detection value detected as three phases to a second d-axis current value and a second q-axis current value; and a detection current processor which generates the feedback current value for the d-axis and the q-axis, by using the first d-axis current and the second d-axis current to compute a d-axis feedback current value, and using the first q-axis current and the second q-axis current to compute a q-axis feedback current value.

Furthermore, the motor control method according to the present invention is a motor control method executed in a motor control device which controls switching of an inverter, in such a manner that a feedback current value generated on the basis of a detection result of a three-phase AC current detection result supplied from an inverter to a motor matches a current command value; the method including: a first step of detecting a first current detection value including three phases for the detection result of the three-phase AC current, by using a first sample timing; a second step of detecting a second current detection value including three phases for the detection result of the three-phase AC current, by using a second sample timing which is set to be a shorter detection cycle than the first sample timing; a third step of converting the coordinates of the first current detection value detected in the first step, to a first d-axis current value and a first q-axis current value; a fourth step of converting the coordinates of the second current detection value detected in the first step, to a second d-axis current value and a second q-axis current value; a fifth step of generating the feedback current value in relation to the d axis by computing a d-axis feedback current value using the first d-axis current detected in the third step and the second d-axis current detected in the fourth step; and a sixth step of generating the feedback current value in relation to the q axis by computing a q-axis feedback current value using the first q-axis current detected in the third step and the second q-axis current detected in the fourth step.

According to the present invention, it is possible to provide a simple configuration wherein the harmonic components synchronized with the rotor position are extracted by the first computation cycle, and furthermore, a fundamental wave component can be extracted on the basis of a second computation cycle which is shorter than the first computation cycle, and a feedback current value can be generated from both components. As a result of this, is it possible to obtain a motor control device and motor control method capable of ensuring torque accuracy by suppressing the occurrence of low-frequency fold-back noise caused by aliasing, while also restricting increase in the computational processing load, as well as being able to ensure control stability with respect to environmental variations, such as angular error, power voltage ripples, and the like.

DESCRIPTION OF THE PREFERRED EMBODIMENTS

Below, a preferred embodiment of a motor control device and a motor control method according to this invention is described with reference to the drawings.

First Embodiment

Figure 1:
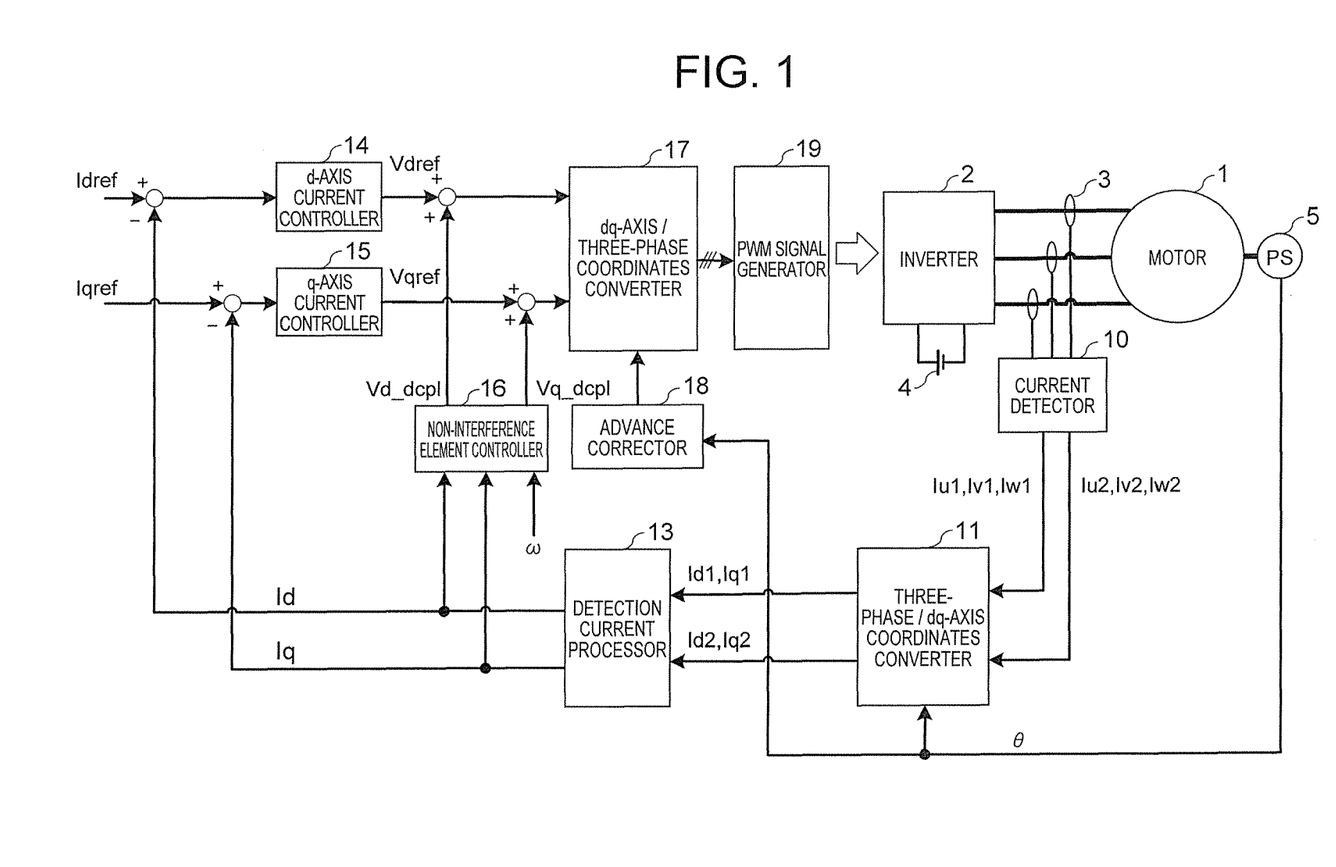
FIG. 1 is a block diagram showing a configuration of a motor control device according to a first embodiment of the present invention.

FIG. 1 is a block diagram showing a configuration of the motor control device according to a first embodiment of the present invention. The motor control device and motor control method according to the first embodiment can be applied to a drive system using a motor of any other type, as well as the motor of an electric automobile or a hybrid automobile.

In FIG. 1, a motor 1 receives a supply of electricity and is driven by using an inverter 2 which converts between direct and alternating current. A current sensor 3 which detects a three-phase current is provided on the AC side of the inverter 2. A DC power source 4 is connected to the DC side of the inverter 2. Furthermore, the rotor position detector 5 is connected to the motor 1.

A current detector 10 detects the output signal of the current sensor 3 at different detection cycles (a first sample timing and a second sample timing). A three-phase/dq-axis coordinates converter 11 reads in the output signal of the rotor position detector 5 and the current detector 10, as input signals.

A detection current processor 13 reads in the output signal of the three-phase/dq-axis coordinates converter 11, as an input signal. A dq-axis/three-phase coordinates converter 17 reads in, as an input signal, the sum or difference of a d-axis voltage command computed by a d-axis current controller 14, and an output value of a non-interference element controller 16. Similarly, the dq-axis/three-phase coordinates converter 17 reads in, as an input signal, the sum or difference of a q-axis voltage command computed by a q-axis current controller 15, and an output value of the non-interference element controller 16.

Moreover, the dq-axis/three-phase coordinates converter 17 reads in, as an input signal, the output signal of the rotor position detector 5 after correction for control delay via advance correction 18. The dq-axis/three-phase coordinates converter 17 is also able read in the output signal of the rotor position detector 5 directly, without passing via advance correction 18. The description given below relates to a case where advance correction 18 is used.

A PWM signal generator 19 generates a PWM signal for driving the inverter 2, on the basis of the output signal of the dq-axis/three-phase coordinates converter 17. The motor 1 is controlled by this series of processing.

The respective constituent elements of FIG. 1 are described in detail below. The motor 1 is constituted by a three-phase AC motor, such as a permanent magnet synchronous motor, an induction motor, a reluctance motor, or the like. The permanent magnet used for the rotor of the permanent magnet synchronous motor employs a rare-earth magnet made of neodymium, or the like. The permanent magnet may be another magnet, such as a samarium cobalt magnet, ferrite magnet, or the like.

The inverter 2 is configured by using, for example, six power switching elements (for example, insulated gate bipolar transistors (IGBT), etc.), and a diode connected in parallel to these power switching elements. Upon receiving a supply of DC voltage which has been smoothed by a smoothing capacitor, the inverter 2 converts the DC voltage to AC voltage, on the basis of an output signal from the PWM signal generator 19, and drives the motor 1, which is an AC motor.

The current sensor 3 detects the three-phase AC current supplied to the motor 1 from the inverter 2, which is a power converter. This current sensor 3 needs to be disposed in at least two phases, and the current detector 10 can determine the current in the remaining phase by computation, taking the sum of the three phases to be zero. The three-phase current detected by the current sensor 3 and computed by the current detector 10 is input to the three-phase/dq-axis coordinates converter 11.

The DC power source 4 is configured from a secondary cell, such as a lead battery, or nickel-hydrogen or lithium ion cell, etc. It is also possible to adopt a configuration in which a DC/DC converter is also connected to step the output voltage of the DC power source 4 up or down and supply the voltage to the inverter.

A resolver, encoder or Hall element, etc. is used as the rotor position detector 5. The rotor position detector 5 is coupled to the rotary shaft of the motor 1, generates rotational angle information on the basis of the rotor position, and outputs the rotational angle information to the three-phase/dq-axis coordinates converter 11 and advance correction 18.

The current detector 10 acquires the analogue signal output from the current sensor 3, in two or more different detection cycles, and converts same into digital data. For example, the first sample timing is the carrier cycle and the second sample timing is a fraction of the carrier cycle. Desirably, the second sample timing is no more than ½ the high-frequency component current (fifth-order or seventh-order) flowing in the motor.

The three-phase/dq-axis coordinates converter 11 converts the three-phase current detected at the sample timings, into two axis components in a rotational coordinates system which is synchronized with the rotor position of the motor, namely, a d-axis component current (magnetic flux component current: Id) and a q-axis component current (torque component current: Iq), on the basis of Expression (1) below.

[Expression 1]

$$\begin{bmatrix} Idx \\ Iqx \end{bmatrix} = \sqrt{\left(\frac{2}{3}\right)} \begin{bmatrix} \cos\theta x & \cos\left(\theta x - \frac{2\pi}{3}\right) & \cos\left(\theta x + \frac{2\pi}{3}\right) \\ -\sin\theta x & -\sin\left(\theta x - \frac{2\pi}{3}\right) & -\sin\left(\theta x + \frac{2\pi}{3}\right) \end{bmatrix} \begin{bmatrix} I_{ux} \\ I_{vx} \\ I_{wx} \end{bmatrix} \quad (1)$$

Here, the current values which are detected and processed at the first sample timing are taken to be a first d-axis current Id1 and a first q-axis current Iq1. Furthermore, the current values detected and processed at the second sample timing which has a shorter computation cycle (detection cycle) than the first sample timing are taken to be a second d-axis current Id2 and a second q-axis current Iq2.

The suffix x in Expression (1) above indicates the sample timing. More specifically, to write the expression in relation to the first sample timing,
x is set to x=1, and
the detected three-phase currents are: Iu1, Iv1, Iw1;
the angle is θ1; and
the two-axis component currents are Id1, Iq1.

The detection current processor 13 computes the d-axis current Id by using the first d-axis current Id1 and the second d-axis current Id2, and computes the q-axis current Iq by using the first q-axis current Iq1 and the second q-axis current Iq2. Here, the d-axis current Id computed by the detection current processor 13 corresponds to the d-axis feedback current value, and the q-axis current Iq computed by the detection current processor 13 corresponds to the q-axis feedback current value.

A d-axis current controller 14 and a q-axis current controller 15 output a d-axis voltage command Vdref and q-axis voltage command Vqref, by carrying out PI control (proportional-integral control) in such manner that feedback values, which are the d-axis current Id and the q-axis current Iq that are the two-axis current values output from the detection current processor 13, match the d-axis current command Idref and q-axis current command Iqref that are computed from the torque command.

The non-interference element controller 16 determines and outputs a d-axis compensatory voltage Vd_dcp1 and q-axis compensatory voltage Vq_dcp1, by the calculation in Expression (2) below, using the d-axis current Id, the q-axis current Iq and the rotational angular frequency ω, as inputs. The current values input to the non-interference element controller 16 may use the d-axis current command Idref and the q-axis current command Iqref.

[Expression 2]

$$\begin{bmatrix} Vd\_dcp1 \\ Vq\_dcp1 \end{bmatrix} = \begin{bmatrix} -\omega * L_q * Iq \\ \omega * L_d * Id + \omega \Phi \end{bmatrix} \quad (2)$$

The symbols in Expression (2) have the following meanings.
Ld: d-axis inductance
Lq: q-axis inductance
φ: magnetic flux of permanent magnet The dq-axis/three-phase coordinates converter 17 reads in, as two-axis voltage command values, the sum or difference of the output value of the d-axis current controller 14 and the output value of the non-interference element controller 16, and the sum or difference of the output value of the q-axis current controller 15 and the non-interference element controller 16. Moreover, the dq-axis/three-phase coordinates converter 17 converts the two-axis voltage command value to a three-phase voltage command value, on the basis of the rotational angle information from the advance correction 18, and outputs same to the PWM signal generator 19.

The advance correction 18 compensates for delay in the acquisition of the electrical angle, and delay in reflection of the voltage command, with respect to the angle detected by the rotor position detector 5.

The PWM signal generator 19 generates a PWM signal for driving the inverter 2, by inputting the three-phase voltage command value from the dq-axis/three-phase coordinates converter 17.

In generating an output waveform, desirably, the frequency of the carrier signal, compared to the three-phase voltage commands of each phase, is as high as possible. However, the carrier frequency is set in the power switching element of the inverter 2 in accordance with the operational state of the device and motor used, due to increased switching loss.

If the ratio of the carrier frequency and the inverter output frequency (called "frequency ratio" below) is sufficiently large (for example, if the frequency ratio is equivalent to several dozens times or more), then an asynchronous PWM method is used in which the output frequency is modified while fixing the carrier frequency.

With regard to the carrier frequency of the asynchronous PWM, it is possible to adopt a configuration which sets a random carrier in which the average carrier frequency is fixed and the carrier frequency width is changed in an irregular fashion, or a configuration which changes the carrier frequency in accordance with the inverter output frequency.

In a region where the inverter output frequency is high (for example, when the frequency ratio is equal to or less than 21), then it is desirable to have a small frequency ratio, due to the increase in the switching loss and the processing load of the microcomputer. However, if the frequency ratio becomes small, then the error with respect to the output voltage of the inverter becomes large, and therefore a synchronous PWM method is used, which synchronizes the carrier frequency in such a manner that the numbers and positions of pulses of the inverter output voltage are symmetrical with respect to $\pi/2$ and $3\pi/2$ in both the positive-side and negative-side half-waves.

In the synchronous PWM method, the number of pulses included in the cycle of the inverter output voltage is often set to be an integral multiple of three carrier cycles. For instance, the synchronous PWM method uses 9 synchronous pulses, 6 synchronous pulses, and 3 synchronous pulses, etc.

Figure 2:
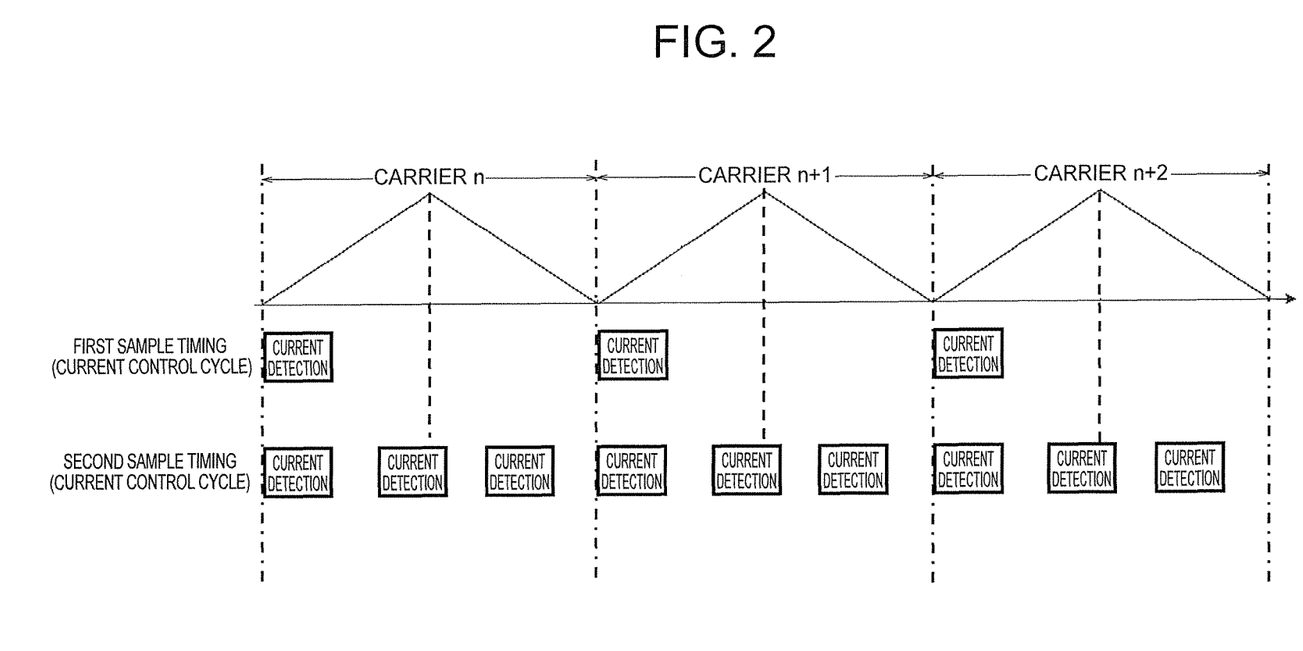
FIG. 2 shows a schematic view of a sampling process of a current detector in the motor control device according to the first embodiment of the present invention.

FIG. 2 shows a schematic view of a sampling process of the current detector 10 in the motor control device according to the first embodiment of the present invention. More specifically, FIG. 2 illustrates a carrier waveform created by a counter, etc. in the microcomputer and the timings for detecting the current at a first sample timing and second sample timing.

The first sample timing is set by taking a "valley-peak-valley" of the carrier wave as one cycle, and the current detector 10 detects the current in synchronism with the timing of the "valley" of the carrier. The first sample timing may be set by taking a "peak-valley-peak" of the carrier wave as one cycle, and in this case, the current detector 10 detects the current in synchronism with the timing of the "peak" of the carrier.

The second sample timing is set to a shorter detection cycle than the first sample timing. For example, if the second sample timing is set to ⅓ times the carrier cycle, then the current detector 10 detects the current at the cycle indicated in FIG. 2.

Figure 3A:
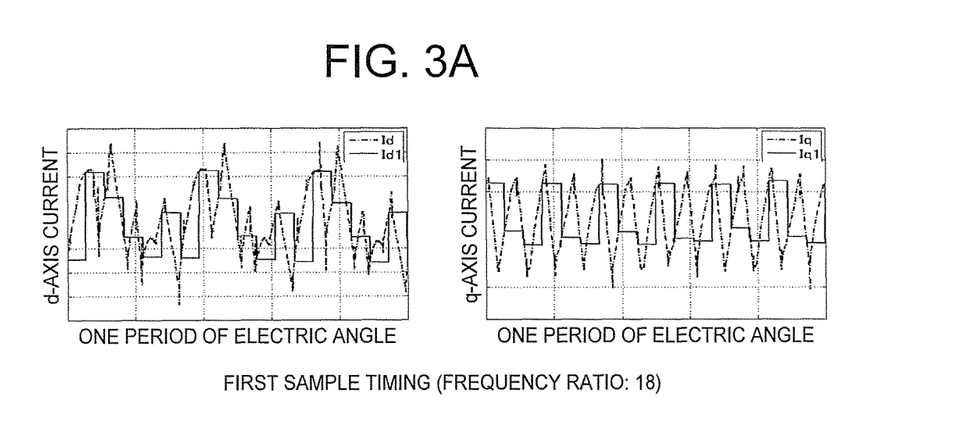
FIGS. 3A to 3C are illustrative diagrams showing the measurement result of the current flowing in the motor when the timing of current detection is changed, in the motor control device according to the first embodiment of the present invention.
Figure 3B:
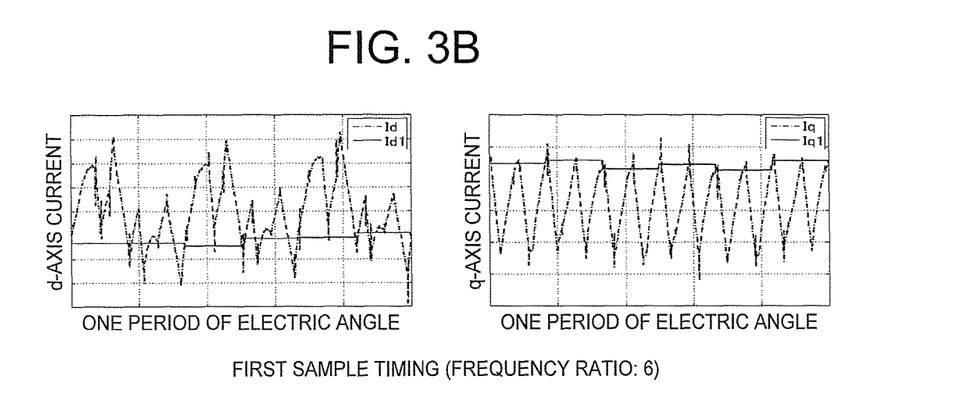
Figure 3C:
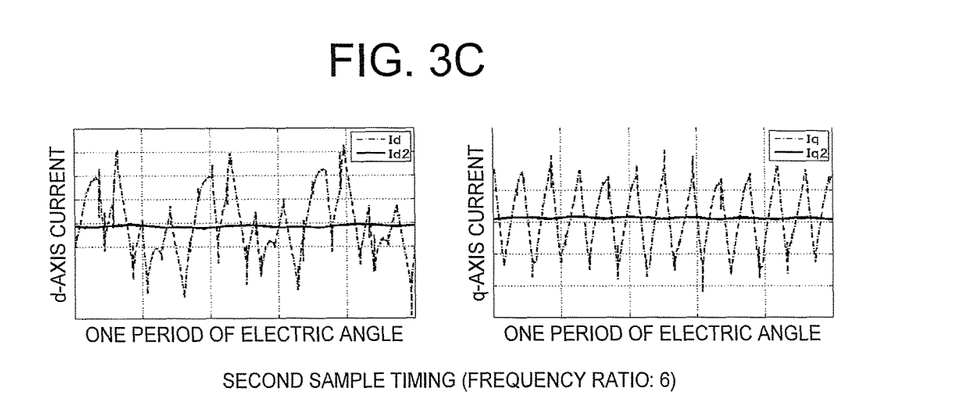

FIGS. 3A to 3C are illustrative diagrams showing the measurement result of the current flowing in the motor when the timing of current detection is changed, in the motor control device according to the first embodiment of the present invention. In the waveforms shown in FIGS. 3A to 3C, the d-axis component current Id and the q-axis component current Iq obtained by three-phase/dq-axis conversion of the actual current waveform (continuous values) are indicated by broken lines, and the d-axis component current and the q-axis component current detected at the sample timings are indicated by solid lines.

The three-phase current flowing in the motor 1 also includes, in addition to the fundamental wave frequency component, harmonic waves such as fifth-order, seventh-order, eleventh-order and thirteenth-order harmonic waves. Therefore, current pulsations caused by the harmonic components occur.

FIG. 3A illustrates the actual current waveform and the current waveform detected at the first sample timing, when the frequency ratio is 18, which corresponds to a state where the rotational speed of the motor 1 is low, for example. As shown in FIG. 3A, when the frequency ratio is relatively large, the current waveforms Id1, Iq1 detected at the first sample timing show little effect of aliasing of the current detection, and the average value (fundamental wave) of the actual current and the average value (fundamental wave) of the detection current are approximately the same. Consequently, there is no deterioration of the torque accuracy, and the motor can be driven with high accuracy.

FIG. 3B, for example, illustrates the actual current waveform and the current waveform detected at the first sample timing, when the frequency ratio is 6, which corresponds to a state where the rotational speed of the motor 1 is high. As shown in FIG. 3B, when the frequency ratio is relatively small, then the current waveforms Id1, Iq1 detected at the first sample timing have an offset in the detection current, since the occurrence of harmonic current pulsations is produced by aliasing of current detection. Consequently, deviation occurs between the average value (fundamental wave) of the actual current and the average value (fundamental wave) of the detection current, and the torque accuracy deteriorates.

FIG. 3C illustrates the actual current waveform, and current waveforms Id2, Iq2 detected at the second sample timing, when the frequency ratio is 6 similarly to FIG. 3B. With the second sample timing, after detecting the current at the cycle illustrated in FIG. 2 described above, the harmonic components are removed by passing through a low-pass filter. The current waveforms Id2, Iq2 and the average value (fundamental wave) of the actual current substantially coincide.

Consequently, in an operating state where the frequency ratio is relatively small, by using the current waveforms Id2, Iq2 detected at the second sample timing, it is possible to drive the motor 1 accurately, with no deterioration in the torque accuracy.

Figure 4:
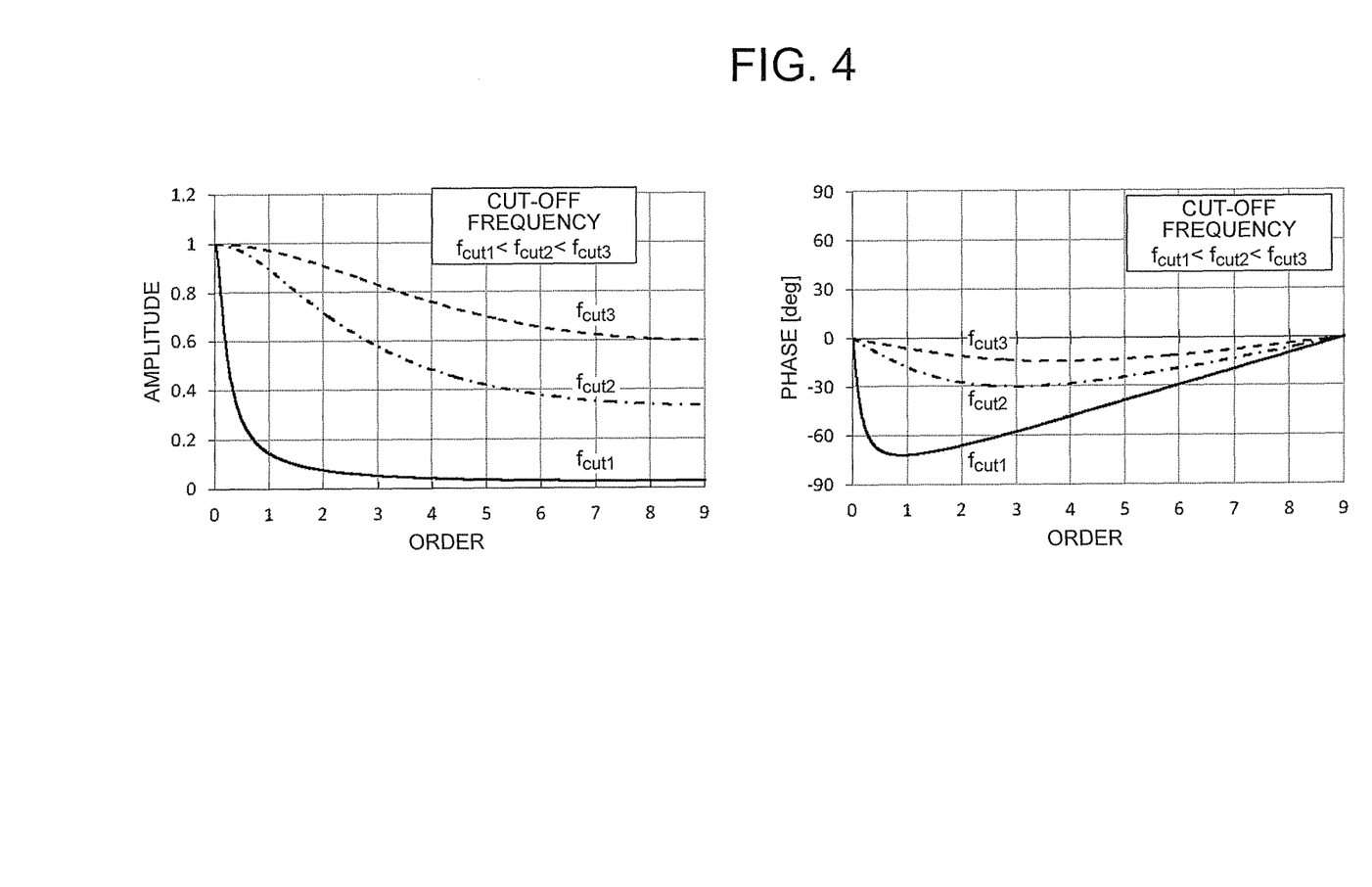
FIG. 4 shows view of the characteristics of a low-pass filter in the motor control device according to the first embodiment of the present invention.

FIG. 4 is a diagram showing the amplitude and phase characteristics with respect to the cut-off frequency of the low-pass filter in the motor control device according to the first embodiment of the present invention. More specifically, FIG. 4 illustrates one example of the amplitude and phase relationships of various orders, with respect to cut-off frequencies of three types. Here, the characteristics are calculated by setting the sampling frequency to 18 times the inverter output frequency.

When the cut-off frequency is small, $f_{cut1}$, for example, the amount of attenuation with respect to the harmonic component current, such as the sixth-order current, is large, and the occurrence of aliasing in the current processed by the detection current processor 13 is suppressed.

Furthermore, when the cut-off frequency is a value of $f_{cut2}$ and $f_{cut3}$ which is larger than $f_{cut1}$, then the attenuation of the harmonic component current is relatively small, and the current input to the detection current processor 13 includes current pulsations caused by the harmonic components. In other words, when the cycle of carrying out current detection is long compared to the current pulsations, aliasing occurs in the current processed by the detection current processor 13.

Consequently, the low-pass filter used in the second computation cycle is set to a cut-off frequency which attenuates the harmonic component current.

Figure 5:
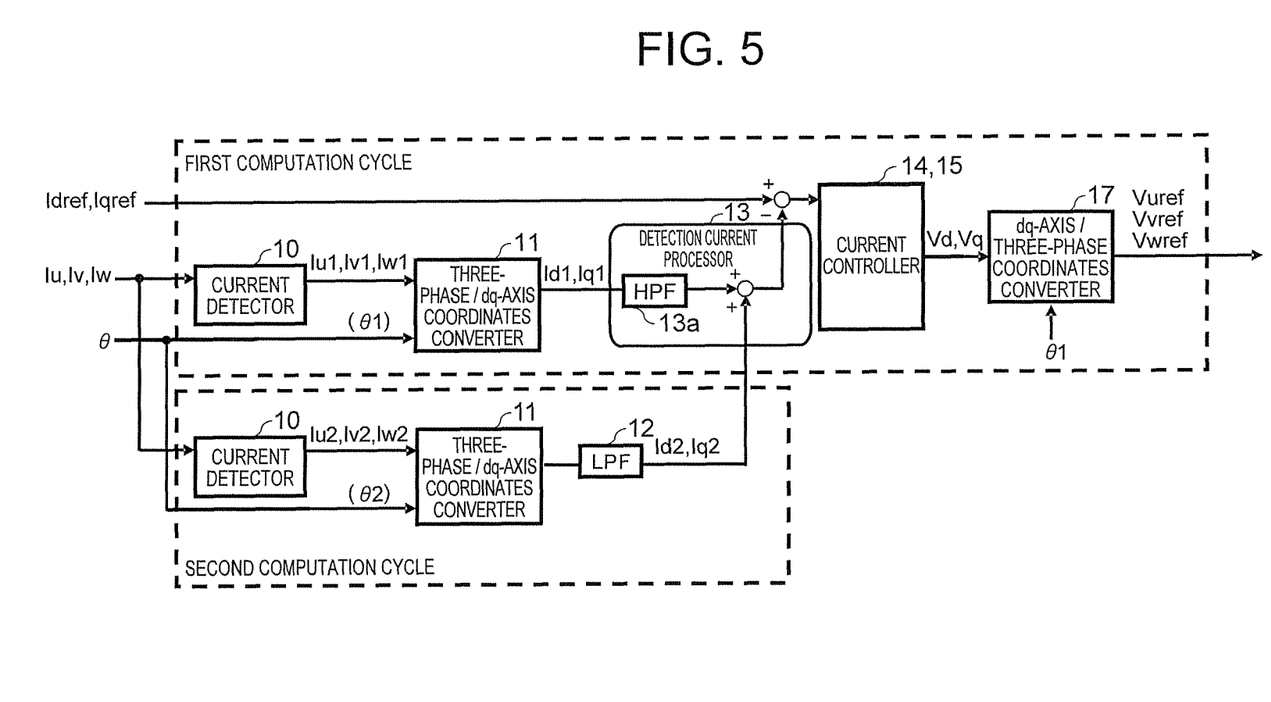
FIG. 5 is a block diagram showing a range for processing at a first computation cycle and a range for processing at a second computation cycle, from the three-phase current detection to the voltage command output, in the motor control device according to the first embodiment of the present invention.

FIG. 5 is a block diagram showing a range for processing at a first computation cycle and a range for processing at a second computation cycle, from the three-phase current detection to the voltage command output, in the motor control device according to the first embodiment of the present invention. More specifically, FIG. 5 illustrates a block diagram for executing control processing using a first computation cycle and a second computation cycle having a shorter cycle than the first computation cycle.

The detection current processor 13 has a high-pass filter 13a, and extracts AC components HPF(Id1), HPF(Iq1) as current values which are harmonic components, by using the high-pass filter 13a to filter the currents Id1, Iq1 detected at the first sample timing. In the first embodiment, a primary high-pass filter is used as a high-pass filter 13a, but similar beneficial effects can be obtained even if a band-stop filter is used.

Furthermore, the detection current processor 13 acquires the currents Id2, Iq2 which are detected at the second sample timing and are extracted as fundamental wave components. The detection current processor 13 computes the d-axis control current Id and the q-axis control current Iq on the basis of Expression (3) below.

[Expression 3]

$$Id=Id2 \pm HPF(Id1)$$

$$Iq=Iq2 \pm HPF(Id1) \qquad (3)$$

By the configuration in FIG. 5, the detection current processor 13 can detect the average value of the actual current (fundamental wave component) and the current including the harmonic components synchronized in the rotor position, as the control currents Id and Iq. As a result of this, it is possible to ensure torque accuracy by suppressing the occurrence of low-frequency fold-back noise caused by aliasing, as well as achieving stable control performance with respect to environmental variations, such as angular errors, power voltage ripples, and so on.

Additionally, the range for processing at the second computation cycle is limited to the current detector 10, the three-phase/dq-axis coordinates converter 11 and the low-pass filter 12 which are surrounded by the dotted frame in the lower part of FIG. 5. Consequently, it is possible to minimize increase in the computation processing capability required of the microcomputer.

As described above, according to the first embodiment, it is possible to provide a simple configuration wherein the harmonic components synchronized with the rotor position are extracted by the first computation cycle, and furthermore, a fundamental wave component can be extracted on the basis of the second computation cycle which is shorter than the first computation cycle, and the control current can be generated from both components. As a result of this, it is possible to ensure torque accuracy by suppressing the occurrence of low-frequency fold-back noise caused by aliasing, without unnecessarily increasing the processing capability of the microcomputer, as well as achieving stable control performance with respect to environmental variations, such as angular errors, power voltage ripples, and so on.

Second Embodiment

Figure 6:
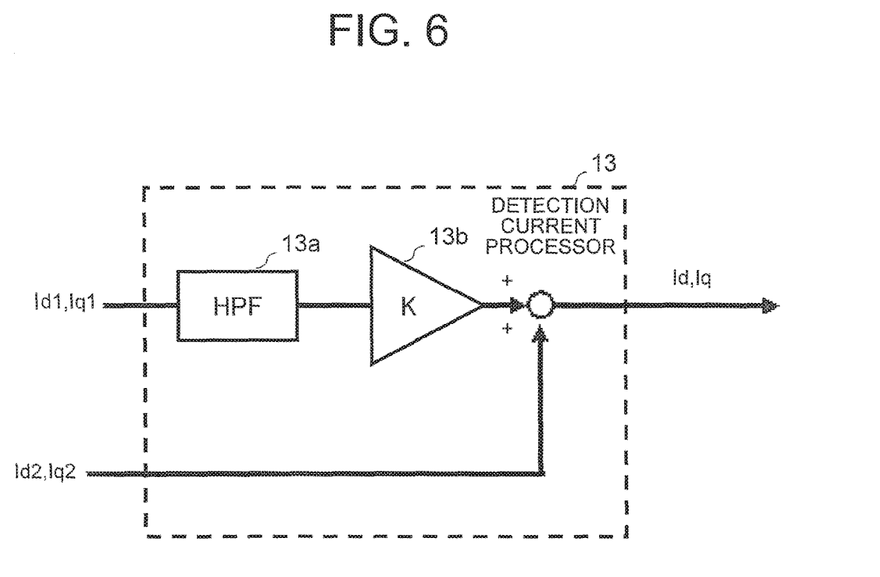
FIG. 6 is a block diagram illustrating the internal configuration of a detection current processor in a motor control device according to a second embodiment of the present invention.

FIG. 6 is a block diagram illustrating the internal configuration of the detection current processor 13 in a motor control device according to a second embodiment of the present invention. The detection current processor 13 extracts the AC components from Id1, Iq1 computed at the first computation cycle, via the high-pass filter 13a, and then multiplies by a predetermined coefficient K in a multiplier 13b.

Here, the coefficient K can change in accordance with the rotational speed, torque value and voltage. By varying the coefficient K, it is possible to suitably compensate the low-order harmonic components which differ according to the operational state of the motor.

On the other hand, the currents Id2, Iq2 computed at the second computation cycle are fundamental wave components from which harmonic components have been removed via the low-pass filter 12 shown in FIG. 5 above. Therefore, the detection current processor 13 according to the second embodiment calculates the control currents Id, Iq, on the basis of Expression (4) below.

[Expression 4]

$$Id = K * HPF(Id1) + Id2$$

$$Iq = K * HPF(Iq1) + Iq2 \qquad (4)$$

Compared to the first embodiment above, the detection current processor 13 according to the second embodiment differs in that the Id1, Iq1 signals are multiplied by a coefficient K after processing by the high-path filter, and is the same in other respects. Consequently, the configuration and processing described in the first embodiment are not described further here.

According to the second embodiment, as described above, a configuration is provided in which the low-order harmonic components are compensated for reliably in accordance with the operational state of the motor, compared to the first embodiment. As a result, it is possible to obtain similar beneficial effects to the first embodiment, as well as being able to further improve the control stability if angular error is superimposed on the resolver.

Third Embodiment

Figure 7:
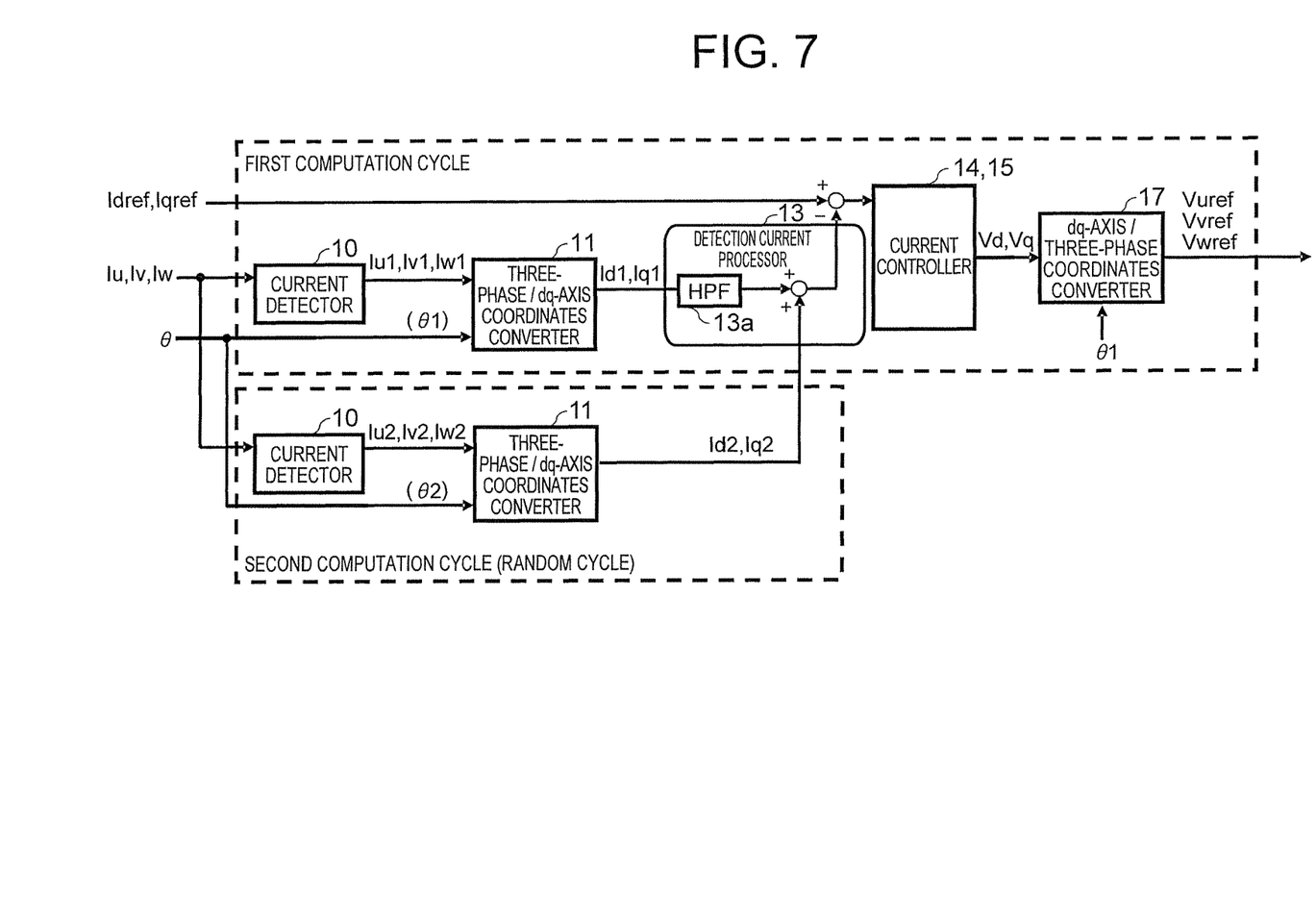
FIG. 7 is a block diagram showing the range for processing at a first computation cycle and the range for processing at a second computation cycle, from the three-phase current detection to the voltage command output, in a motor control device according to a third embodiment of the present invention.

FIG. 7 is a block diagram showing a range for processing at a first computation cycle and a range for processing at a second computation cycle, from the three-phase current detection to the voltage command output, in a motor control device according to a third embodiment of the present invention.

Compared to the configuration in FIG. 5 according to the first embodiment, the configuration in FIG. 7 according to the third embodiment differs in that the second computation cycle is a random cycle, and furthermore the low-pass filter 12 is not provided.

Figure 8:
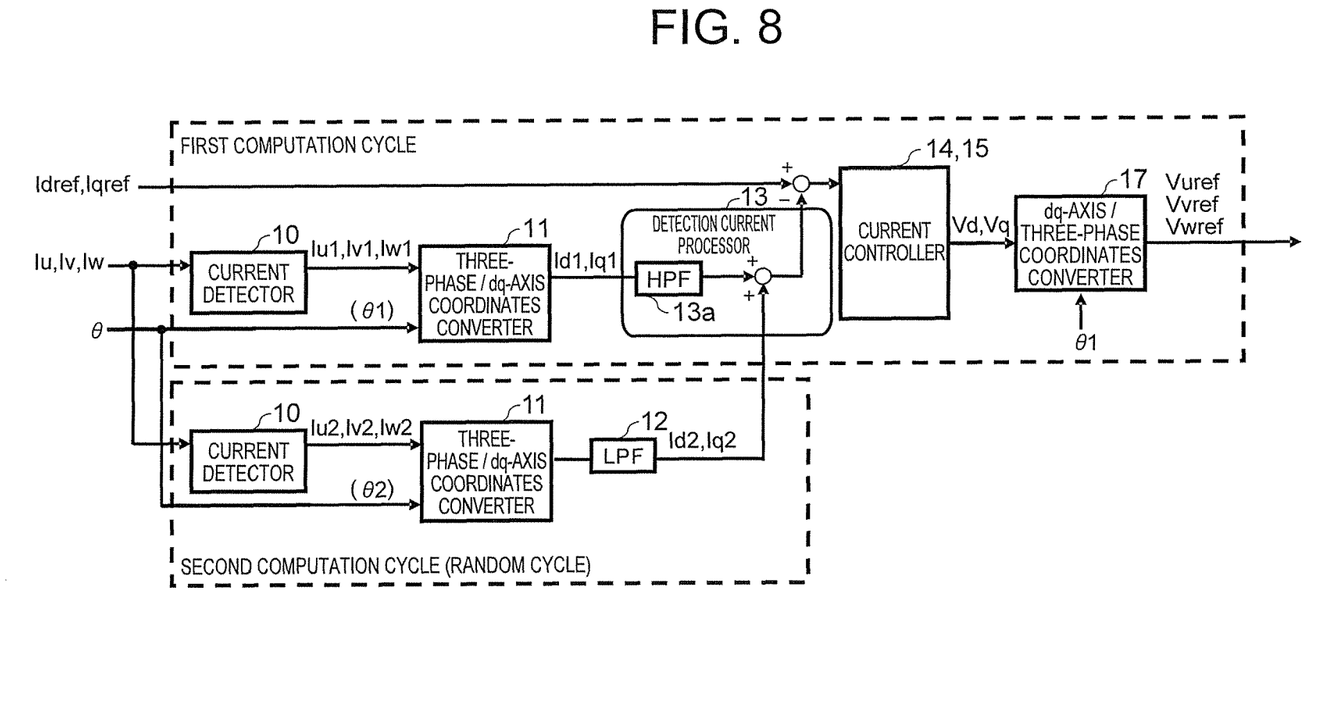
FIG. 8 is a block diagram having a different configuration to FIG. 7, showing a range for processing at the first computation cycle and a range for processing at the second computation cycle, from the three-phase current detection to the voltage command output, in the motor control device according to the third embodiment of the present invention.

Furthermore, FIG. 8 is a block diagram having a different configuration to FIG. 7, showing the range for processing at the first computation cycle and the range for processing at the second computation cycle, from the three-phase current detection to the voltage command output, in the motor control device according to the third embodiment of the present invention.

Compared to the configuration in FIG. 5 according to the first embodiment, the configuration in FIG. 8 according to the third embodiment differs in that the second computation cycle is a random cycle. Consequently, the configurations in FIG. 7 and FIG. 8 according to the third embodiment are the same in respect of the fact that the second computation cycle is a random cycle, and are only different in respect of the presence or absence of the low-pass filter 12.

Figure 9:
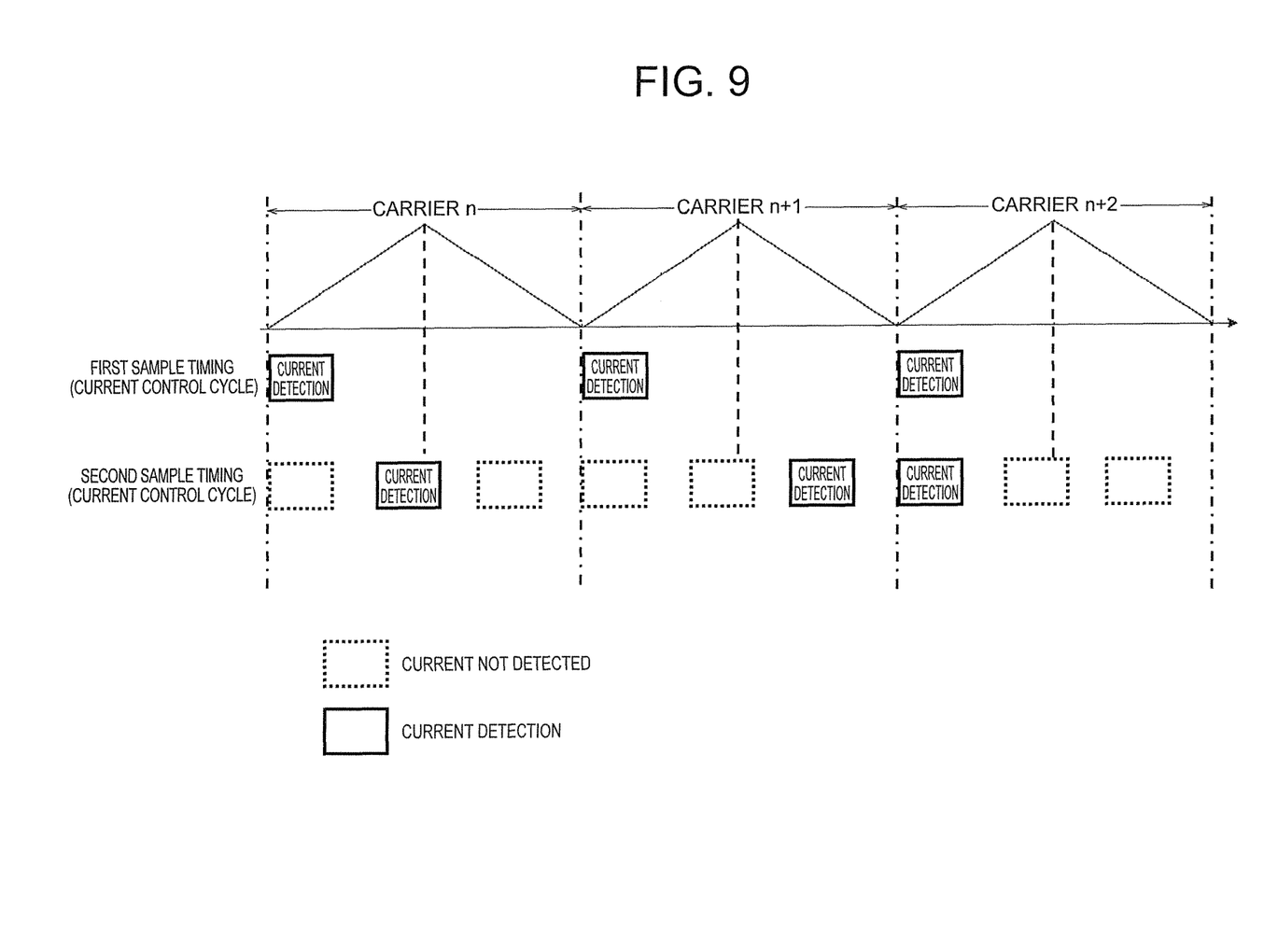
FIG. 9 shows a schematic view of a sampling process of a current detector in the motor control device according to the third embodiment of the present invention.

FIG. 9 shows a schematic view of a sampling process of the current detector 10 in the motor control device according to the third embodiment of the present invention. As shown in FIG. 9, the second sample timing according to the third embodiment is set randomly to at least once during the first computation cycle. Consequently, the current detector 10 carries out current detection processing at a random cycle, in accordance with this second sample timing.

Here, the current values which are detected at the second sample timing and have been subjected to three-phase/dq-axis conversion processing are taken to be Id2 and Iq2. FIG. 7 corresponds to a configuration wherein the signal after three-phase/dq-axis conversion processing is directly input to the detection current processor 13, and FIG. 8 corresponds to a configuration wherein the signal that has been subjected to three-phase/dq-axis conversion processing and then passed through the low-pass filter 12 is input to the detection current processor 13.

The configurations in FIG. 7 and FIG. 8 can suppress aliasing while restricting the number of current detections, and also suppress increase in the processing load, in comparison with the configuration of the first embodiment described above.

Furthermore, the configuration in FIG. 7 can further suppress increase in the processing load in relation to the first embodiment, since the low-pass filter is not required in the second computation cycle.

On the other hand, the configuration in FIG. 8 is able to further reduce current error caused by aliasing, due to the addition of a low-pass filter to the configuration in FIG. 7.

The third embodiment differs from the first embodiment in that the second computation cycle is random, and is the same in other respects. Consequently, the configuration and processing described in the first embodiment are not described further here.

According to the third embodiment, as described above, a configuration is provided which restricts the number of detections, by making the timing of performing current detection within the second computation cycle random. As a result of this, it is possible to achieve similar beneficial effects to the first embodiment, as well as restricting the number of current detections and suppressing increase in the processing load. Furthermore, it is possible to further suppress increase in the processing load, by eliminating the low-pass filter in the processing at the second computation cycle.

In the first to third embodiments described above, it is possible to achieve the series of processing from the current detector 10 to the PWM signal generator 19, by means of a computer. Moreover, it is also possible to adopt an independent hardware configuration with regard to the low-pass filter 12 and high-pass filter 13a, and the processing can also be achieved by computational processing in a controller.

What is claimed is:

1. A motor control device, comprising:
   an inverter which converts a direct current (DC) to an alternating current (AC);
   a motor which is connected to an output side of the inverter and is driven by receiving an AC voltage;
   a current sensor which detects the AC current of the inverter; and
   a controller which performs a current detection on an output signal from the current sensor at a first sample timing and a second sample timing that are pre-set, generates a feedback current value based on a result of the current detection, and controls the inverter in such a manner that the feedback current value matches a current command value,
   wherein the controller includes:
      a current detector which receives AC current values from the current sensor, and outputs, as the result of the current detection, a first current detection value based on the first sample timing and a second current detection value based on the second sample timing, the second sample timing having a shorter sampling cycle than that of the first sample timing within a detection cycle of the current detector, a coordinates converter which converts coordinates of the first current detection value, detected as three phases, to a first d-axis current value and a first q-axis current value, and converts coordinates of the second current detection value, detected as three phases, to a second d-axis current value and a second q-axis current value, the first current detection value and the second current detection value being obtained based on the first sample timing and the second sample timing, respectively, within the same detection cycle, and a detection current processor which generates the feedback current value for a d-axis as a combination of the first d-axis current value and the second d-axis current value that are obtained for the detection cycle, to compute a d-axis feedback current value, and generates the feedback current value for a q-axis as a combination of the first q-axis current value and the second q-axis current value that are obtained for the detection cycle, to compute a q-axis feedback current value.

2. The motor control device according to claim 1, wherein the second sample timing used in the current detector is set previously to no more than ½ of a carrier cycle.

3. The motor control device according to claim 2, wherein the controller further includes a low-pass filter which carries out a filtering process for passing a low-frequency component of the second d-axis current value and the second q-axis current value of which the coordinates have been converted by the coordinates converter; and the detection current processor generates the feedback current value by using the second d-axis current value and the second q-axis current value that have undergone the filtering process by the low-pass filter.

4. The motor control device according to claim 2, wherein the current detector outputs the second current detection value by randomly selecting, at least once, the second sample timing within the detection cycle determined by the first sample timing.

5. The motor control device according to claim 2, wherein the controller further includes a high-pass filter which carries out a filtering process for passing a high-frequency component of the first d-axis current value and the first q-axis current value of which the coordinates have been converted by the coordinates converter; and the detection current processor generates the feedback current value by using the first d-axis current value and the first q-axis current value that have undergone the filtering process by the high-pass filter.

6. The motor control device according to claim 5, wherein the detection current processor generates the feedback current value by using a value obtained by multiplying, by a predetermined coefficient, the first d-axis current value and the first q-axis current value that have undergone the filtering process by the high-pass filter.

7. The motor control device according to claim 2, wherein the detection current processor computes the d-axis feedback current value by finding as a sum or a difference of the first d-axis current value and the second d-axis current value, and computes the q-axis feedback current value by finding a sum or a difference of the first q-axis current value and the second q-axis current value.

8. The motor control device according to claim 2, wherein, when the controller controls the inverter using a PWM signal, the first sample timing used in the current detector is set to be longer than a computation cycle for generating the PWM signal.

9. The motor control device according to claim 1, wherein the controller further includes a low-pass filter which carries out a filtering process for passing a low-frequency component of the second d-axis current value and the second q-axis current value of which the coordinates have been converted by the coordinates converter; and the detection current processor generates the feedback current value by using the second d-axis current value and the second q-axis current value that have undergone the filtering process by the low-pass filter.

10. The motor control device according to claim 1, wherein the current detector outputs the second current detection value by randomly selecting, at least once, the second sample timing within the detection cycle determined by the first sample timing.

11. The motor control device according to claim 1, wherein the controller further includes a high-pass filter which carries out a filtering process for passing a high-frequency component of the first d-axis current value and the first q-axis current value of which the coordinates have been converted by the coordinates converter; and the detection current processor generates the feedback current value by using the first d-axis current value and the first q-axis current value that have undergone the filtering process by the high-pass filter.

12. The motor control device according to claim 11, wherein the detection current processor generates the feedback current value by using a value obtained by multiplying, by a predetermined coefficient, the first d-axis current value and the first q-axis current value that have undergone the filtering process by the high-pass filter.

13. The motor control device according to claim 1, wherein the detection current processor computes the d-axis feedback current value as a sum or a difference of the first d-axis current value and the second d-axis current value, and computes the q-axis feedback current value by finding a sum or a difference of the first q-axis current value and the second q-axis current value.

14. The motor control device according to claim 1, wherein, when the controller controls the inverter using a PWM signal, the first sample timing used in the current detector is set to be longer than a computation cycle for generating the PWM signal.

15. The motor control device according to claim 1, wherein the controller further includes:

a high-pass filter which performs a filtering process for passing a high-frequency component of the first d-axis current value and the first q-axis current value, respectively, wherein the detection current processor is configured to:

generate the d-axis feedback current value by computing a sum or a difference between the second d-axis current value and at least a portion of the high-frequency component of the first d-axis current value to compute the d-axis feedback current value, and generate the q-axis feedback current value by computing a sum or a difference between the second q-axis current value and at least a portion of the high-frequency component of the first q-axis current value.

16. A motor control method executed in a motor control device which controls switching of an inverter in such a manner that a feedback current value generated based on a detection result of a three-phase AC current supplied from the inverter to a motor matches a current command value, the motor control method comprising:
- computing a first current detection value by using a first sample timing on the detection result of the three-phase AC current;
- computing a second current detection value by using a second sample timing on the detection result of the three-phase AC current, the second sample timing having a shorter sampling cycle than that of the first sample timing within a detection cycle;
- converting coordinates of the first current detection value to a first d-axis current value and a first q-axis current value;
- converting coordinates of the second current detection value to a second d-axis current value and a second q-axis current value; and
- generating the feedback current value for a d-axis by computing a d-axis feedback current value as a combination of the first d-axis current value and the second d-axis current value that are obtained for the detection cycle and for a q-axis by computing a q-axis feedback current value as a combination of the first q-axis current value and the second q-axis current value that are obtained for the detection cycle,
- wherein the generating the feedback current value comprises generating the feedback current value based on the first current detection value obtained based on the first sample timing and the second current detection value obtained based on the second sample timing, the first current detection value and the second current detection value being obtained within the same detection cycle.

* * * * *